United States Patent [19]

DeFrancisci

[11] Patent Number: 5,134,926
[45] Date of Patent: Aug. 4, 1992

[54] STEAMING PROCESS FOR SHORT CUT PASTA

[75] Inventor: Leonard DeFrancisci, Manhasset, N.Y.

[73] Assignee: Defrancisci Machine Corp., Ridgewood, N.Y.

[21] Appl. No.: 728,139

[22] Filed: Jul. 10, 1991

Related U.S. Application Data

[62] Division of Ser. No. 406,045, Sep. 12, 1989.

[51] Int. Cl.$^5$ .......................... A23L 1/01; A23L 3/04; A47J 27/00; A47J 27/18
[52] U.S. Cl. .......................... 99/355; 99/404; 99/407; 99/443 C; 99/470
[58] Field of Search ................. 99/403, 404, 330, 339, 99/352, 353, 355, 356, 357, 360, 361, 407, 410, 443 C, 450, 470, 477, 483; 426/451, 496, 510, 511

[56] References Cited

U.S. PATENT DOCUMENTS

| | | | |
|---|---|---|---|
| 2,948,619 | 8/1960 | Ashley | 99/470 |
| 3,073,236 | 1/1963 | Blaschek et al. | 99/470 |
| 3,889,009 | 6/1975 | Lipoma | 99/443 C |
| 4,121,509 | 10/1978 | Baker et al. | 99/443 C |
| 4,543,263 | 9/1985 | Goldhahn | 426/511 |
| 4,569,849 | 2/1986 | Codino | 426/451 |
| 4,784,053 | 11/1988 | Barnhart | 99/407 |
| 4,803,917 | 2/1989 | Barbieri | 99/410 |
| 4,873,917 | 10/1989 | Sugimura et al. | 99/477 |
| 4,887,524 | 12/1989 | Ellis-Brown | 426/523 |
| 4,934,259 | 6/1990 | Watanabe | 99/355 |

FOREIGN PATENT DOCUMENTS

| | | | |
|---|---|---|---|
| 3604808 | 8/1987 | Fed. Rep. of Germany | 99/470 |
| 2387607 | 12/1978 | France | 99/470 |
| 0109764 | 6/1984 | Japan | 99/470 |

Primary Examiner—Timothy F. Simone
Attorney, Agent, or Firm—Darby & Darby

[57] ABSTRACT

A short cut pasta treatment apparatus utilizes a steamer (13) for steam treating short cut pasta products after extrusion and before handling. The steamer has a housing (14) in which pipes (23) with nozzles (24) are disposed, both above and below an endless belt conveyor (21) which passes through the housing. "Green" pasta is carried by the conveyor through the housing, exposing the pasta to live steam. The pasta is steam treated for a time sufficient to partially gelatinize and cook the pasta product, which reduces tackiness and strengthens the product to limit breakage. Air is then drawn by the pasta by a pair of fans (25) to stop the cooking process and cool the pasta, allowing the partially cooked pasta to be handled and stored without agglomeration. The pasta product is then transported by a conveyor (28) to metering means.

6 Claims, 2 Drawing Sheets

STEAMING PROCESS FOR SHORT CUT PASTA

This is a division of application Ser. No. 406,045, filed Sept. 12, 1989.

TECHNICAL FIELD

This invention relates a method and apparatus for steam treating fresh short cut pasta for increasing handling strength, allowing automatic processing without drying.

BACKGROUND

Alimentary products are usually prepared from flour, such as semolina, durum or other hard wheat, and water, which are metered in proper proportions and mixed until the wheat absorbs the water, forming a viscous pasta dough. Other ingredients, such as whole eggs or egg whites, are often added to enhance cooking quality. The dough is then extruded or otherwise formed to produce a shaped pasta product, such as spaghetti, or cut into smaller short cut products such as elbow macaroni or alphabet pasta. These cut products are termed "short cut pasta products", to distinguish from long cut products such as spaghetti. The resulting short cut product usually has a predetermined size, shape and weight.

After extrusion, the fresh pasta product, commonly referred to in the industry as "green" pasta, may be dried and placed in a can along with sauce and other ingredients and then cooked. However, dried pasta is not as flavorful as fresh pasta, and the pasta is more preferably prepared without ever passing through a drying operation. Generally, methods do exist for canning long pasta, such as spaghetti, in a "green" or undried state. However, it has never been practical to directly package short cut products such as elbow macaroni or alphabet pasta. The main problem is that these short cut products are soft, and quite plastic and sticky due to their high moisture content. When attempting to handle fresh short cut products by conveying or passing through volumetric or gravimetric scaling devices, or storing for any length of time, the product tends to loose its shape, stick together or stick to various parts of the equipment.

Thus, the current state of the art for preparing short cut pasta products calls for drying the product to commercial moisture levels of about 10-12%, prior to separation, weighing and packaging. However, this drying process requires substantial energy, while further reducing freshness and increasing the chance for product contamination, as the drying process generally takes between 3 and 8 hours. Such a drying process requires very large and expensive drying equipment, adding substantially to the cost required to prepare a short cut product.

SUMMARY OF THE INVENTION

It is an object of the present invention to provide a method and apparatus for packaging short cut pasta products without requiring a drying step.

It is a further object of the present invention to provide a method and apparatus which is adaptable to continuous operation, substantially shortening the time required to produce a packaged short cut pasta product.

It is another object of present invention to eliminate the need for large and expensive drying equipment when canning short cut pasta products.

These and other objects of the present invention are achieved by a short cut pasta product treatment process comprising: exposing the short cut product to live steam for a time sufficient to partially gelatinize the short cut product; and, cooling the product using ambient air. The process may further comprise separating any lumps of the product which may have formed during the steaming process and packaging the short cut pasta product. Utilizing live steam to treat the short cut product eliminates stickiness while adding strength to the product so that it can be handled by automatic conveying and weighing equipment without deformation and at the same partially pasteurizes the product to increase its wholesomeness. Thus the pre-handling treatment leaves the product rubbery and strong, although it still maintains a high moisture content, on the order of 29-32%. This steaming has an additional advantage of increasing the thermal resistance of the product to reduce the potential for overcooking during the final cooking step after the pasta is incorporated in a package.

The apparatus used in performing the process of the present invention comprises a steamer, having a housing and means for supplying live steam therein. One or more pipes may be used to supply the steam, each pipe having a plurality of nozzles for injecting steam into the housing. The nozzles are sized to admit sufficient steam to partially gelatinize the pasta, without cooking it. The steamer has duct means to carry away excess steam and to prevent pressurization. Conveying means, such as a continuous porous belt, may be used to carry the short cut pasta product through the steamer at a controlled speed. The apparatus further comprises cooling means for passing air by the short cut product after steaming for removing surface moisture and cooling the product. The conveying means may similarly carry the product by the cooling means. Pneumatic conveying means may be disposed at the end of the apparatus, to receive the product for delivery to its next processing point. Such conveying means also separates any product which may have stuck together during the steaming process. Metering means are generally provided at the end of the pneumatic conveying means for dosing the short cut pasta product into packages, such as cans. Conventional volumetric or gravimetric weighing machines may be used. The process may then be completed with conventional apparatus such as sauce filling means, can seaming means, cooking means and sterilization means.

DETAILED DESCRIPTION OF THE PREFERRED EMBODIMENT

Figure 1:
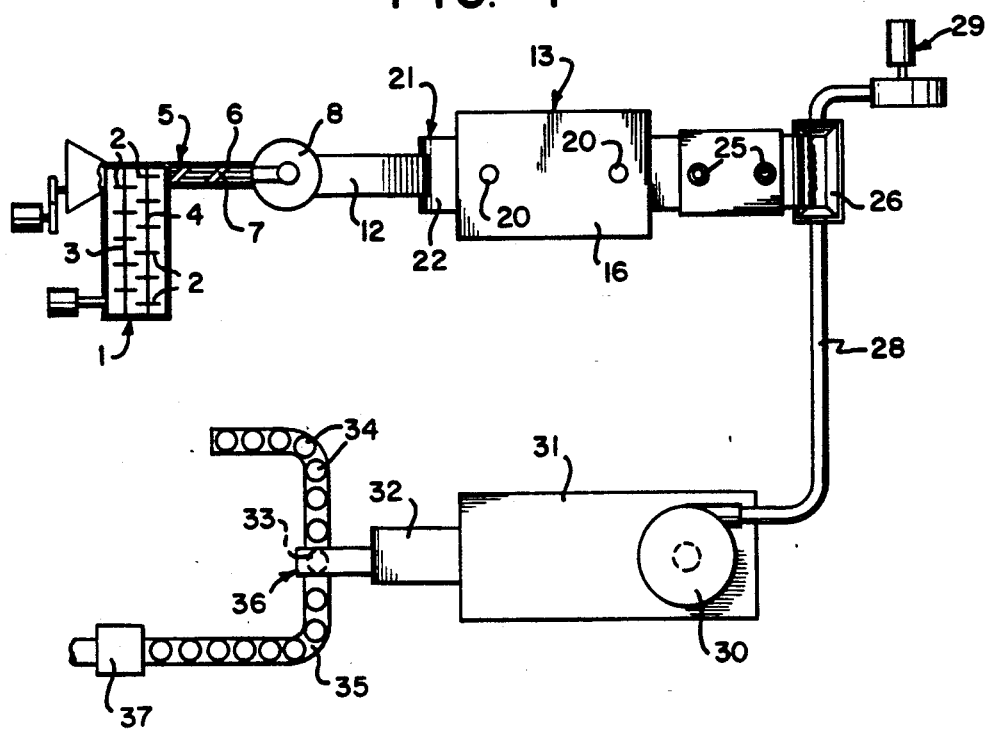
FIG. 1 is a diagrammatic view of the pretreatment process of the present invention.

FIG. 1 is a schematic view of a short cut pasta canning process. For exemplary purposes, the process is shown as producing short cut pasta for canning. However, it will be understood that the pasta can be placed in pouches, or other types of packages.

Referring to FIG. 1, the process begins with a mixer 1 into which one or more types of flour, and water are metered, preferably by computer control, and mixed to form a viscous pasta dough. Other ingredients such as whole eggs or egg whites may also be added in the mixer, with these and other ingredients being generally known in the art. The mixer is of conventional design including paddles 2 on two shafts, 3 and 4, for keeping the ingredients and the resulting dough constantly mixing. An exemplary continuous feed alimentary pasta mixer is disclosed in U.S. Pat. No. 4,121,301 to Defrancisci, the disclosure of which is hereby incorporated by reference.

The dough resides in the mixer for about 10–12 minutes, until the dough achieves a viscous, almost granular consistency, indicating that it is ready for extrusion.

After mixing, the dough falls by gravity into an extruder 5 which has a long barrel 6, with an auger 7 disposed therein. The auger 7 drives the dough forward, to produce the pressure needed for extrusion. At the end of the auger is a die plate 8 which includes a number of shaped holes (not shown). Various die hole configurations may be used depending on the type of product made. For example, the dough may be extruded through alphabet shaped holes to produce an alphabet type pasta product. As the pasta is extruded through the holes in the die, a knife blade 10, positioned next to the die surface, cuts the pasta to the desired length, forming a green short cut pasta product 11. The knife 10 may be controlled by a timer or respond to a particular length of pasta passing a length indicator. This assures that all the pasta is cut to approximately the same length. Some examples of short cut pasta include ziti, alphabet pasta, animal shaped pasta, elbow macaroni or the like.

Figure 2:
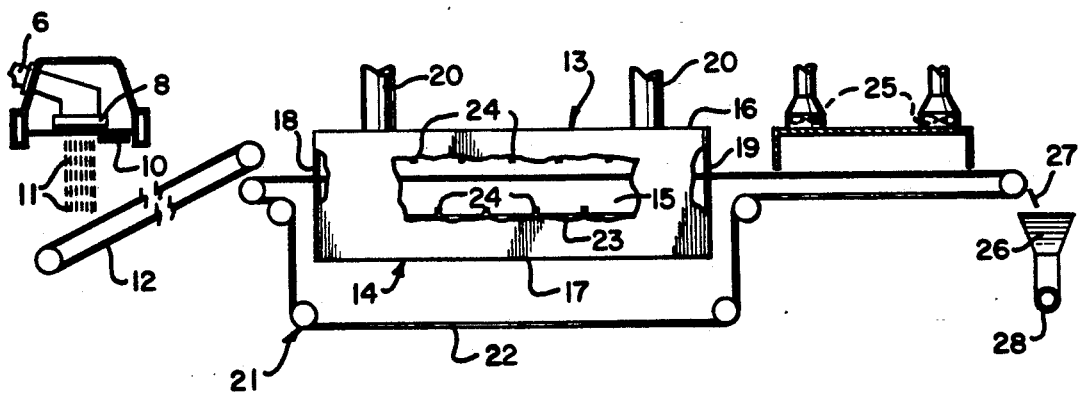
FIG. 2 is a side view of the pretreatment apparatus usable for performing the steaming process of the present invention.

As the cut raw pasta 11 drops from the knife blade, it lands on a conveyor 12 which transports the cut raw pasta to a steamer 13. Referring to FIG. 2, the steamer has a housing 14 surrounding a steam chamber 15. The housing is rectangular and has a roof 16, a floor 17 and inlet and outlet openings, 18 and 19, respectively. Two vents 20 are provided in the roof 16. The steamer is preferably about 10–60 feet long, and made of stainless steel.

A endless conveyor 21 has a porous belt 22, which passes through the steam chamber, carrying the short cut pasta product. The belt 22 is preferably made of wire mesh which may be coated with a non-stick material, such as a fluorocarbon elastomer. The belt is generally between about 20–48 inches wide. The belt passes through the chamber, and then returns to the inlet opening by passing beneath the steamer.

Figure 3:
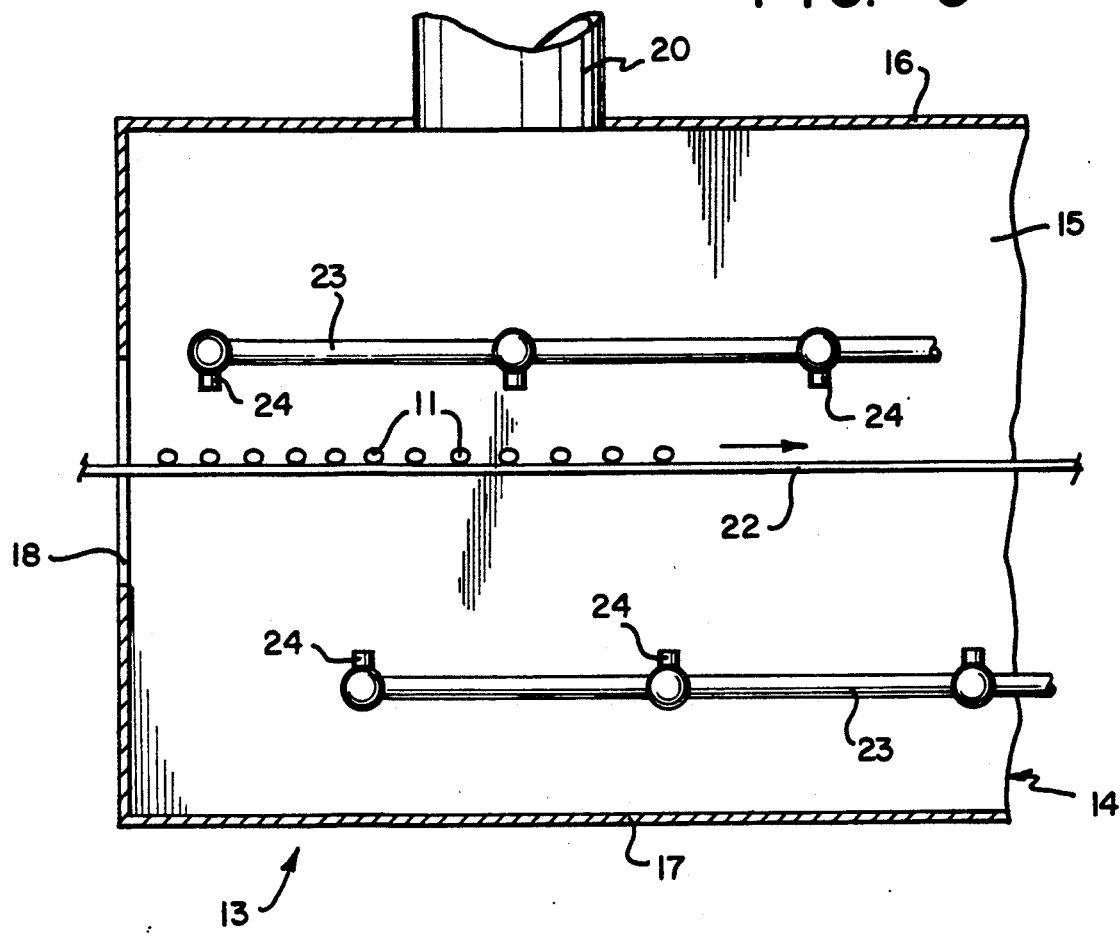
FIG. 3 is an enlarged cross-sectional view of the steamer usable in the present invention.
Figure 4:
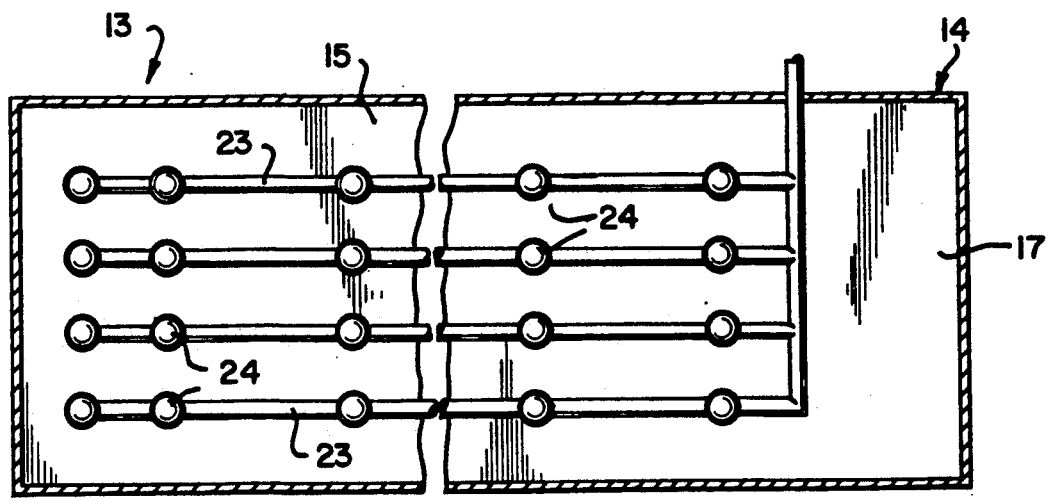
FIG. 4 is a top view of the steam nozzle arrangement of FIG. 3.

Referring to FIGS. 3 and 4, a plurality of steam pipes 23 are disposed in the housing above and below the porous belt. Each pipe has a plurality of nozzles 24 uniformly spaced for admitting live steam to the chamber. "Live steam" refers to the direct contact of the product with the steam.

Sufficient steam is admitted to partially gelatinize and cook the short cut pasta product as it passes through the steamer, providing a product which is less sticky than the uncooked pasta product, yet retains a high moisture content. Generally, the steam is provided at a pressure of about 1–15 psi, preferably 1–7 psi, which is suitable for treating the short cut pasta product. Generally, low pressure steam is preferred as higher pressure steam could damage the delicate raw pasta product during treating. Similarly, the speed of the belt is controlled to limit the exposure of the pasta to the steam to prevent over-cooking. Generally, the pasta is steam treated for about 1–4 minutes. Of course, the bulkier short cut products will require longer exposure times while small, delicate products will require less, and the process is not limited by this range. Steaming is done to obtain a moisture content of about 25–35%, by weight, preferably 29–32%.

After steaming, the pasta product is cooled using ambient air. Referring again to FIG. 2, the conveyor 21 carries the pasta 11 past a pair of fans 25, which draw air through the porous belt 22. Of course, the air may either be blown beneath the belt or drawn through the belt. The air cools the pasta to stop further cooking, and removes surface moisture. The air flow also agitates the product to prevent agglomeration or sticking to the conveyor belt. Cooling is provided by drawing air by the product for from 10–30 seconds.

A hopper 26 is placed at the end of the belt 22, beneath a doctor blade 27. The blade 27 assures that all the pasta enters the hopper. The hopper 26 feeds directly into a conveyor 28, which is preferably a pneumatic conveyor, which uses an air stream to move a product. A blower 29 supplies the air which carries the product through the conveyor. Since the pasta has been steam treated according to the inventive process, it can be handled by such equipment without damage or agglomeration. Such a conveyor offers an additional advantage, by separating any lumps formed during the steaming process.

A cyclone separator 30 is located at the end of the conveyor 28. The separator separates the pasta from the air stream for deposit onto a shaker conveyor 31 which is used to temporarily accumulate the product. Such a conveyor keeps the product fluid to prevent agglomeration. The shaker conveyor feed the pasta product to a gravimetric weigher 32.

The metering means are used to dose the short cut pasta product into packages, such as cans. Conventional volumetric or gravimetric scaling devises may be used, and operates with the shaker conveyor to allowed flow from the shaker conveyor to the weigher until a particular set weight limit is reached. The conveyor forward motion is then stopped, but the shaking continues. Were the product not steam treated, it could not be handled in this way. The gravimetric weigher 32 empties by discharging the cut pasta product 11 into a can 33.

Empty cans 34 are staged on a conveyor 35 and are provided in a single line to a loading position 36 beneath the weigher. The cans are controlled conventionally to stop beneath the gravimetric weigher, until filled, and then another empty can is staged in the loading position. After filling, the cans stop at a checker 37 to assure that they are of the proper weight. The cans are then sent for other processing steps, such as the addition of sauces or flavoring agents or for sealing, which all use conventional equipment.

The partial steaming of the cut pasta product prior to handling provides a product which is less susceptible to breakage and is easily handled without sticking. An automated short cut pasta system is achieved which is far superior to the manual systems presently used, as a costly and time consuming drying step is avoided, while providing a fresher, more wholesome product. The cycle time is reduced from 3–8 hours to 1–5 minutes. In addition, by precooking the short cut pasta with steam, the resulting pasta product is less susceptible to overcooking in the final cooking step after canning, increasing cooking consistency from package to package. Thus, a higher quality product is achieved, with a substantial savings in equipment and operating costs.

While the invention has been shown and described in relation to a particular steamer/cooler apparatus, it will understood by those skilled in the art that various other steamer configurations could be used to produce the treated pasta product of the present invention and other equipment variations could be done used varying from the scope of the present invention.

I claim:

1. An apparatus for producing a short cut pasta product comprising:

a steamer, having a housing, steam application means, disposed within the housing, for providing live steam for partially gelatinizing and cooking the pasta product;

cooling means for passing ambient air by the pasta product to stop the cooking and to cool the pasta product;

first conveying means for conveying the pasta product through the housing at a controlled rate to limit exposure of the pasta product to the live steam; and second conveying means disposed adjacent the first conveying means for transporting the treated pasta product to metering means.

2. The apparatus of claim 1 wherein the cooling means comprise one or more fans for drawing air by the pasta product.

3. The apparatus of claim 1 wherein the conveying means a porous endless belt conveyor.

4. The apparatus of claim 1 further comprising a cyclone separator, disposed at the end of the second conveying means for separating the treated pasta product.

5. The apparatus of claim 4 further comprising metering means for metering a portion of the collected pasta product into a package.

6. The apparatus of claim 1 wherein the second conveying means is a pneumatic conveyor.

* * * * *